United States Patent [19]

Dupuis

[11] 4,424,604
[45] Jan. 10, 1984

[54] WHEEL KIT FOR AN ITEM OF FURNITURE

[76] Inventor: Emanuel F. Dupuis, 21 Prince Philip Dr., St. Catharines, Ontario, Canada, L2N 3H9

[21] Appl. No.: 255,009

[22] Filed: Apr. 17, 1981

Related U.S. Application Data

[63] Continuation-in-part of Ser. No. 906,463, May 17, 1978, abandoned.

[30] Foreign Application Priority Data

Sep. 28, 1978 [CA] Canada ................................. 312270

[51] Int. Cl.³ .............................................. B60B 33/00
[52] U.S. Cl. ...................................... 16/29; 16/18 R
[58] Field of Search .................. 16/18, 29, 30, 31, 40, 16/112, 113, 32; 108/161; 280/43.24

[56] References Cited

U.S. PATENT DOCUMENTS

| | | | |
|---|---|---|---|
| 55,567 | 6/1866 | Wilkins | 16/30 |
| 691,532 | 1/1902 | Clark | 16/30 |
| 722,569 | 3/1903 | Dilger | 16/30 |
| 1,004,550 | 10/1911 | Bertke | 16/30 X |
| 1,388,721 | 8/1921 | Keeping | 16/30 |
| 1,604,723 | 10/1926 | Rutherford | 16/29 |
| 1,933,637 | 11/1933 | Plym | 16/112 |
| 2,800,679 | 7/1957 | Schultz, Jr. | 16/29 |
| 2,972,506 | 2/1961 | Haag | 108/161 UX |
| 3,259,432 | 7/1966 | Jackson | 16/18 R X |
| 3,639,942 | 2/1972 | Ostrom | 16/29 |
| 3,711,110 | 1/1973 | Logerquist | 280/43.24 |
| 3,886,625 | 6/1975 | Rollband | 16/112 |

FOREIGN PATENT DOCUMENTS 787918  12/1957  United Kingdom .................... 16/29

Primary Examiner—James M. Meister
Assistant Examiner—John S. Brown
Attorney, Agent, or Firm—Hirons, Rogers & Scott

[57] ABSTRACT

A wheel kit for mobilizing a picnic table and the like, comprising a handle assembly adapted to be attached to a horizontal member for lifting one end of the table and one or two wheel assemblies adapted to be attached to a leg or leg members at the opposite end of the table is disclosed. When the table is lifted by the handle assembly, the wheels of the wheel assemblies serve to move the table over the ground. The assemblies have thin sheet metal bracket members including L-shaped portions and channel-forming rims which are secured to the respective table members by fasteners such as screws and/or nails. Each bracket member has a horizontal part that is interposed between the respective leg end and the ground while the associated horizontal part carries the wheel at a fixed distance from the horizontal part and thus the ground. Thus the wheel is always properly positioned for ground clearance with the table horizontal and ground engagement when tilted. Moreover a single size of bracket can be accurately and firmly secured to table legs, etc. of different thickness.

2 Claims, 4 Drawing Figures

WHEEL KIT FOR AN ITEM OF FURNITURE

CROSS-REFERENCE TO RELATED APPLICATIONS

This application is a continuation-in-part of my application Ser. No. 906,463, filed May 17th, 1978, now abandoned.

BACKGROUND OF THE INVENTION

The present invention is concerned with improvements in wheel kits for furniture and, more particularly, to a wheel and handle kit for mobilizing the item of furniture.

REVIEW OF THE PRIOR ART

It is frequently desirable to move furniture, such as work benches, picnic tables, wooden lawnchairs with service tables and the like from one location to another. Thus, a picnic table may be moved from one location to another in order to have the table located at a more shady location, or the table may have to be moved when cutting the lawn. Since picnic tables are customarily constructed of lumber, they tend to be heavy, and are difficult to move by one person without great effort and, unless precautions are taken, the legs will leave unsightly furrows in lawns while being pulled along the ground. Other heavy equipment such as tables for tablesaws, work benches and other tables constructed of structural lumber members present similar problems when they are to be moved about.

A successful wheel kit must be capable of retrofitting to existing tables, benches, etc. by the owner, who may be relatively unskilled. The brackets or the like supporting the wheels must therefore be capable of fitting to the legs in a manner that will properly position the wheels relative to the ground without requiring fine adjustment, so that they will just be clear of the ground while the table is horizontal, but will properly engage the ground upon tilting the table just the right amount.

Another difficulty encountered is that tables and benches are made locally by small manufacturers who may use very different sizes of wood for the same purpose. To this problem may be added the other that a nominal structural lumber 2"×4" produced by one mill may differ significantly in actual dimensions from that from another mill. A further complication is the notorious dimensional instability of wood, particularly the softwoods that are now used for structural lumber, and especially for an item that may be left outside all year, so that the leg dimensions after a prolonged spell of low humidity will differ considerably from those after a period of high humidity.

Previously suggested structures have not been able to meet these requirements. For example U.S. Pat. No. 691,532 issued Jan. 21st, 1902 to Clark discloses a wheel attachment for children's high chairs to enable them to be wheeled from place to place consisting of a sheet metal sleeve that wraps around the circular cross-section chair leg and provides two opposed parallel brackets to support the wheel. The fixture must be positioned accurately before fastening to the leg and can only be used with a leg of predetermined diameter.

U.S. Pat. No. 1,004,550 issued Oct. 3rd, 1911 to Berthe shows a step ladder attachment that is substantially similar in structure, except that the legs are of rectangular cross-section. Step ladders are usually made of harder woods than picnic tables and the ladders of one manufacturer will be reasonably consistent in dimensions, but can differ considerably between manufacturers.

U.S. Pat. No. 2,972,506 issued Feb. 21, 1961 to Burroughs Manufacturing Co. discloses wheel assemblies for metal tables in which L-shaped brackets may be used beneath the leg ends to protect the floor from the raw metal edges. The brackets at one end, or at both ends, may carry wheels which are positioned beneath the leg ends in permanent contact with the ground.

DEFINITION OF THE INVENTION

It is accordingly an object of the present invention to provide a new wheel kit for an item of furniture such as a picnic table or similar furniture or equipment.

It is also an object of the present invention to provide a wheel kit adapted for retrofit mounting on existing items of furniture by relatively unskilled labour.

In accordance with the present invention there is provided a wheel kit for an item of furniture, comprising:

at least one wheel assembly adapted to be attached to one end of a furniture item, the assembly having a wheel adapted to engage the ground for support of the said one end of the furniture item from the ground when the other end of the furniture item is lifted from the ground the furniture item is thus moved from a horizontal position to a tilted position in which it is to be moved on the wheel assembly; and the wheel assembly comprising a wheel bracket member having an L-shaped portion with a protruding rim member, the L-shaped portion having a first vertical bracket part adapted for engagement with a surface of the furniture item that is at least approximately vertical when the furniture item is in horizontal position, and a second horizontal bracket part comprising a flat bottom plate adapted for engagement with a bottom surface of the furniture item that is horizontal when the furniture item is in horizontal position, the said flat bottom plate being interposed between the said furniture item bottom surface and the ground so that when the furniture item is horizontal it rests upon the flat bottom plate and the flat bottom plate is in turn in contact with the ground;

the protruding rim member extending from the second horizontal bracket part parallel to the first vertical bracket part and being spaced therefrom so that the respective part of the furniture item is interposed between them;

the said L-shaped portion having at least one aperture therein for the passage of fastening means therethrough to secure the bracket member to the furniture item;

the bracket member further having a vertically-disposed bracket arm extending from said first vertical bracket part and carrying a respective wheel mounted thereon for rotation about a horizontal axis, the vertical spacing between said flat bottom plate and said horizontal axis being substantially equal to the radius of the wheel whereby the wheel is located in predetermined position clear of the ground when the furniture item is horizontal, and in predetermined position for engagement with the ground for movement of the furniture item on the wheel upon said tilting of the furniture item.

DESCRIPTION OF THE DRAWINGS

Particular preferred embodiments of the invention will now be described, by way of example, with reference to the accompanying drawings, wherein.

DESCRIPTION OF THE PREFERRED SPECIFIC EMBODIMENTS

Figure 1:
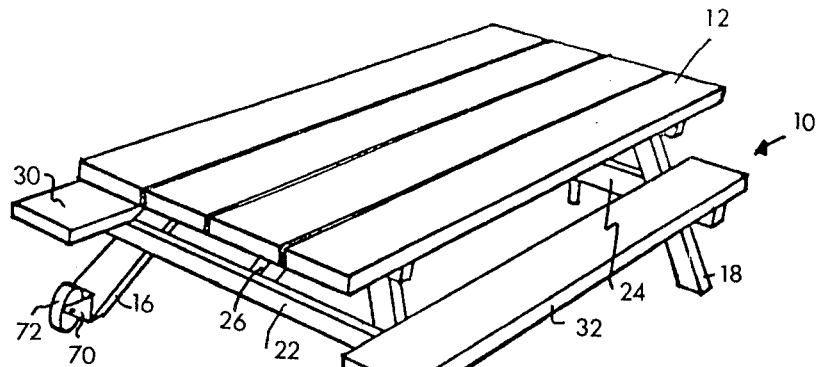
FIG. 1 is a perspective view of a picnic table including the wheel assembly of the wheel kit in accordance with one embodiment of the present invention.

With reference to FIG. 1, a picnic table 10, constructed, for example, of 2 inch thick lumber, has a table top 12 and two pairs of vertical legs 14, 16 and 18, 20, each pair of legs being braced by horizontal leg brace members 22, 24. Further bracing of the table top 12 is provided by obliquely disposed support members 26, 28, extending between the two brace members 22, 24 and the underside of the table top 12, respectively. The picnic table 10 has integral seating provided by board 30, 32 resting on and secured to suitable extensions of brace members 22, 24, as is known in the art.

Figure 2:
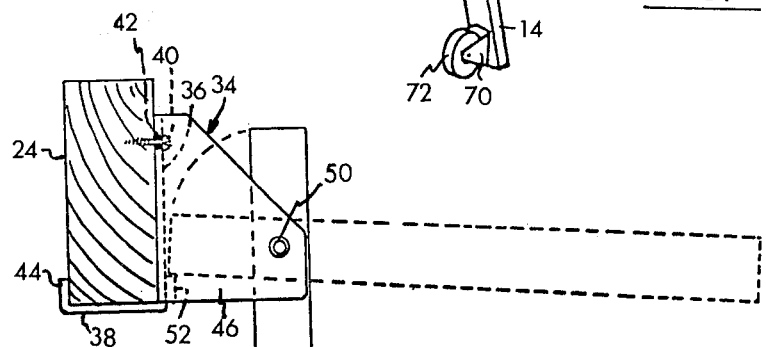
FIG. 2 is a side elevation, partly in cross-section, of a handle assembly of the wheel kit in accordance with one embodiment of the present invention.

A wheel kit handle assembly adapted for attachment to picnic table 10, specifically brace member 24, is shown in FIG. 2.

The handle assembly is comprised of a handle bracket member 34 having an L-shaped portion with a first upstanding leg 36 and a second horizontal leg 38. The legs are secured to the cross member 24 by a fastener 40 passed through opening 42 in first leg 36. Second leg 38 includes an upwardly extending rim portion 44 for positive retention of the handle bracket member 34 on the cross member 24.

First leg 36 has a pair of spaced bracket arms 46 (of which only one can be seen in FIG. 2) forming a clevis mounting for handle member 48 which is pivotally mounted by a shaft 50 secured in bracket arms 46. Handle member 48 normally extends downwardly, due to gravity, as indicated in solid lines in FIG. 2 and can be brought into operative position, whereby the end of the picnic table to which it is attached can be lifted. To limit the movement of handle member 48, an abutment 52 is provided near the horizontal leg 38, which abutment may be formed of a raised deformation produced by cutting and stretching of the material of leg 36, as is known in the art.

Thus, when turning the handle member 48 in counter-clockwise direction, movement of the free end will be arrested by the abutment 52 and further lifting of the handle 48 will cause lifting of the corresponding picnic table end to which it is attached.

Figure 3:
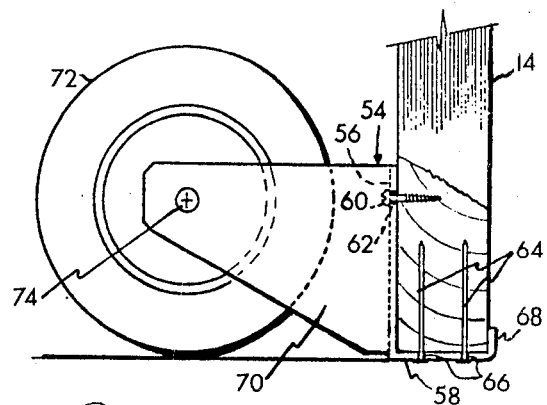
FIG. 3 is a side elevation showing in detail the attachment of the wheel assembly to a picnic table leg.

In order to move the picnic table from one location to another, the wheel kit assembly comprises two identical wheel assemblies, of which only one is shown in FIG. 3, for attachment to table legs 14 and 16.

The wheel assembly has a wheel bracket member 54 having an L-shaped portion with a first vertical leg 56 and a second horizontal leg 28 constituted by respective flat metal plates. It will be seen that the wheel bracket member 54 and the handle bracket member 34 are essentially similar in construction, and in fact the same sheet metal element can be used for both purposes. The vertical leg plate 56 is secured to picnic table leg 14 by a wood screw 60 passing through an opening 62, while the horizontal leg plate 58 is interposed between the ground and the end of the vertical leg and is secured by nails 64 passed through openings 66. For positive retention of leg 14 horizontal leg plate 58 has an upwardly extending rim 68, integrally formed with the horizontal leg 58 and parallel to the vertical leg 56. It will be seen therefore that the wheel bracket member can readily be attached to any dimension of leg 14, even by unskilled persons, since the leg is simply dropped on to the flat bottom plate 58 and the nails and screws driven home without the need for vertical adjustment. The width of the leg is immaterial, since it will in any case usually overlap the bracket which is simply centered by eye. If the leg is thinner than the space between vertical plate 56 and rim 69 it will still be held sufficiently securely. The leg may of course be thicker and for this eventuality the rim can be made saw-toothed, so that it can then be driven by quite gentle hammering into the relatively soft wood of the leg until the bottom plate contacts the leg bottom surface; the hammering required to drive the nails 64 will usually be sufficient for this purpose.

A pair of spaced bracket arms 70, (only one of which can be seen in FIG. 3) extends forwardly from vertical leg 56 forming thereby a clevis for a wheel 72 rotatably mounted about a horizontal axis by a shaft 74 which is secured to bracket arms 70. The wheel 72 can be a standard lawnmower wheel and need not be described here. The distance between the horizontal axis and the horizontal leg plate 58 is fixed and therefore the position of the wheel relative to the ground is fixed automatically when the bracket is fastened in place. It will again be seen that as long as the leg end sits on the plate leg plate 58 no adjustment for wheel height is required. The thin metal plate 58 will make no perceptible change in the horizontal attitude of the table and the wheel will be in its desired position just clear of the ground. Moreover, the wheel is accurately positioned so that it will engage the ground with just the necessary amount of lifting of the table opposite end.

Figure 4:
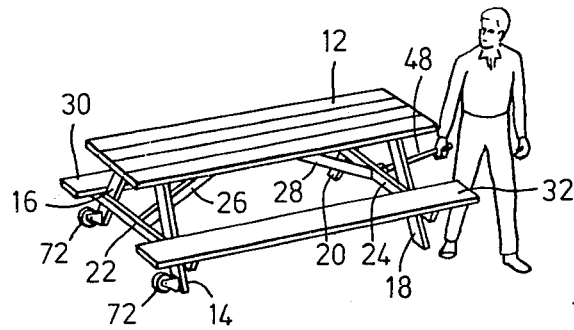
FIG. 4 is a perspective view showing the location of the handle and wheel assemblies of the kit for movement of the picnic table by an operator.

As can best be seen with reference to FIGS. 1 and 4, the handle assembly is secured to horizontal brace member 24, approximately centrally between the table legs 18 and 20, while at the opposite end of the table vertical legs 14 and 16 are each equipped with a wheel assembly. The picnic table can now be moved from one location to another by simply lifting handle member 48, while its free end rests against abutment 52, as shown in dash lines in FIG. 2. The picnic table is moved with relative ease from one location to another due to the conversion of sliding friction into rolling friction.

It will be appreciated that modifications can be made to the embodiments described. Thus, two handle members may be used, particularly when a relatively heavy picnic table has to be relocated. Attachment of the bracket members can be by utilization of more than the fasteners described. Instead of the integrally formed abutment for the handle member, an abutment may be provided by welding a piece of bar stock to the vertical leg of the handle member bracket.

While the embodiments of the invention have been described with reference to a picnic table or similar item of furniture, it will be appreciated that the kit in accordance with the present invention can also be used in mobilizing other similar heavy items constructed of structural lumber such as, for example, wooden lawn chairs with service tables, and other heavy duty tables such as workbenches, tables for tablesaws, and storage tables used in stores and warehouses.

I claim:

1. In the combination of a furniture item and a wheel and handle kit for mobilization of the furniture item, the combination comprising:

at least one wheel assembly attached to one end of the furniture item, the assembly having a wheel engageable with the ground for support of the said one end of the furniture item clear of the ground when the other end of the furniture item is lifted from the ground and the furniture item is thus moved from a horizontal position to a tilted position in which it is to be moved on the wheel assembly;

and at least one handle assembly attached to the said other end of the furniture item for the said lifting thereof from the ground;

wherein the wheel assembly comprises a wheel bracket member having an L-shaped portion with a protruding rim member, the L-shaped portion having a first vertical bracket part engaged with a surface of the furniture item that is at least approximately vertical when the furniture item is in horizontal position, and a second horizontal bracket part comprising a flat bottom plate engaged with a bottom surface of the furniture item that is horizontal when the furniture item is in horizontal position, so that the said flat bottom plate is interposed between the said furniture item bottom surface and the ground, the furniture item rests upon the flat bottom plate, and the flat bottom plate is in turn in contact with the ground;

wherein the protruding rim member extends from the second horizontal bracket part parallel to the first vertical leg bracket part and is spaced therefrom so that the respective part of the furniture item is interposed between them;

wherein the said L-shaped portion has at least one aperture therein; and fastening means passing through the said aperture into the furniture item to secure the bracket member thereto;

wherein the bracket member further has a vertically-disposed arm extending from said first vertical bracket part and carrying a respective wheel mounted thereon for rotation about a horizontal axis, the vertical spacing between said flat bottom plate and said horizontal axis being substantially equal to the radius of the wheel, whereby the wheel is located in predetermined position clear of the ground when the furniture item is horizontal, and is in engagement with the ground for movement of the furniture item on the wheel upon said tilting of the furniture item.

2. A combination as claimed in claim 1, wherein said handle assembly comprises a handle bracket member having an L-shaped portion with a protruding rim member, the L-shaped portion having a first vertical bracket part engaged with a furniture item surface that is at least approximately vertical when the furniture item is in horizontal position, and a second horizontal bracket part engaged with a furniture item surface that is horizontal when the furniture item is horizontal, the protruding rim member extending from the second horizontal bracket part parallel to the first vertical bracket part and spaced therefrom so that the respective part of the item is interposed between them;

the bracket member further having a vertically-disposed bracket arm extending from said first vertical leg part and carrying a handle member pivotally mounted by said bracket arm about a horizontal axis for movement between a vertical inoperative position and a horizontal operative position for lifting the respective end of the furniture item.

* * * * *